United States Patent
Fong et al.

(10) Patent No.: US 7,624,496 B2
(45) Date of Patent: Dec. 1, 2009

(54) METHOD FOR EFFICIENT SLIDER BURNISHING DURING DRIVE BUILD

(75) Inventors: Walton Fong, San Jose, CA (US); Donald Ray Gillis, San Jose, CA (US); Remmelt Pit, Cupertino, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1190 days.

(21) Appl. No.: 10/652,065

(22) Filed: Aug. 29, 2003

(65) Prior Publication Data
US 2005/0044696 A1 Mar. 3, 2005

(51) Int. Cl.
G11B 5/127 (2006.01)
H04R 31/00 (2006.01)

(52) U.S. Cl. .............. 29/603.12; 29/603.03; 29/603.04; 29/603.07; 360/97.02; 360/97.03; 360/234.1; 360/254.4; 360/254.8; 451/5; 451/41

(58) Field of Classification Search .............. 29/603.03, 29/603.04, 603.07; 360/97.02, 97.03, 234.1, 360/254.4, 254.8, 255.3, 255.7
See application file for complete search history.

(56) References Cited

U.S. PATENT DOCUMENTS

| | | | | |
|---|---|---|---|---|
| 4,789,913 A | | 12/1988 | Gregory et al. ......... 360/97.03 |
| 4,901,185 A | * | 2/1990 | Kubo et al. ............. 360/246.1 |
| 5,229,899 A | * | 7/1993 | Brown et al. ............ 360/97.02 |
| 5,526,204 A | * | 6/1996 | French et al. ........... 360/97.02 |
| 5,822,163 A | | 10/1998 | Lee et al. .................... 360/135 |
| 6,168,831 B1 | | 1/2001 | Khan et al. ................. 427/240 |
| 6,359,433 B1 | * | 3/2002 | Gillis et al. ................. 324/210 |
| 6,433,965 B1 | * | 8/2002 | Gopinathan et al. ...... 360/235.4 |
| 6,493,184 B1 | * | 12/2002 | Smith ........................ 360/135 |
| 6,521,286 B2 | * | 2/2003 | Isozaki ...................... 427/130 |
| 6,580,585 B2 | | 6/2003 | Feliss et al. ............. 360/254.8 |
| 6,700,735 B2 | * | 3/2004 | Gregory et al. .......... 360/97.02 |
| 6,707,631 B1 | * | 3/2004 | Haddock ..................... 360/75 |
| 6,762,909 B2 | * | 7/2004 | Albrecht et al. .......... 360/97.02 |
| 6,934,101 B2 | * | 8/2005 | Fong et al. .................... 360/31 |

FOREIGN PATENT DOCUMENTS

JP          55028554 A    *    2/1980

OTHER PUBLICATIONS

"Assessment of surface damage mechanisms of head/disk interface using CSS and drag tests"; Koo-Hyun Chung; Sung-Chang Lee; Dae-Eun Kim; Magnetics, IEEE Transactions on vol. 34, Issue 4, Part 1; Jul. 1998; pp. 1714-1716.*

* cited by examiner

Primary Examiner—Paul D Kim
(74) Attorney, Agent, or Firm—Zilka-Kotab, PC

(57) ABSTRACT

A method for creating a disk drive. A slider is installed in a disk drive having at least one unlubricated disk. The slider is designed to be in initial contact. The slider is burnished to the final design point. A vapor phase lubricant reservoir system is installed in the drive either before or after the burnishing step.

4 Claims, 3 Drawing Sheets

METHOD FOR EFFICIENT SLIDER BURNISHING DURING DRIVE BUILD

FIELD OF THE INVENTION

The present invention relates to manufacture of disk drive systems, and more particularly, this invention relates to a method for burnishing a slider and assembling a disk drive assembly.

BACKGROUND OF THE INVENTION

A magnetic disk drive storage device typically comprises one or more thin film magnetic disks, each having at least one data recording surface including a plurality of concentric tracks of magnetically stored data, a spindle motor and spindle motor controller for supporting and rotating the disk (s) at a selected RPM, at least one read/write transducer or "head" per recording surface formed on a slider for reading information from and writing information to the recording surface, a data channel for processing the data read/written, a positionable actuator assembly for supporting the transducer in close proximity to a desired data track, and a servo system for controlling movement of the actuator assembly to position the transducer(s) over the desired track(s).

Each slider is attached on one surface to an actuator arm via a flexible suspension and includes on an opposite side an air bearing surface (ABS) of a desired configuration to provide favorable fly height characteristics. As the disk rotates, an air flow enters the slider's leading edge and flows in the direction of its trailing edge. The air flow generates a positive pressure on the ABS, lifting the slider above the recording surface. The slider is maintained at a nominal fly height over the recording surface by a cushion of air.

To avoid the problems associated with contact during start/stop of the disk, some disk drive designs employ "load/unload" technology. According to this design, a ramp is provided for each slider/suspension assembly at the inner or outer diameter of the disk where the slider is "parked" while the spindle motor is powered down. During normal operation, the disk speed is allowed to reach a selected RPM (which may be below the normal operating RPM) before the head is "loaded" onto the disk from the ramp on the air cushion generated by the disk's rotation. In this manner, the slider flies over the disk without significant contact with the disk surface, eliminating contact start/stop wear. The load/unload ramp structure is generally made of plastic which can be injection molded into complex ramp structures.

With lower fly heights between the transducer head and the magnetic disk during operation of the disk drive, there is an increasing rate of intermittent contacts between the head and the disk resulting in damage to the disk surface. Although the disk is coated with lubricant during manufacture to protect it from such intermittent contact, during operation of the drive, the lubricant is depleted from the surface of the disk. Because of the problems associated with lubricant spin-off from the disk, a vapor phase lubricant reservoir system has been disclosed as a means for continuously maintaining a uniform lubricant film on the disk as described in U.S. Pat. No. 4,789,913 issued Dec. 6, 1988, which is herein incorporated by reference. The patent describes a method for lubricating the disk during operation of the drive. This method of lubrication continuously maintains the lubricant film on the disk drive during operation of the drive. U.S. Pat. No. 6,580,585, issued on Jun. 17, 2003 and also incorporated by reference, discloses a system using a porous lubricant reservoir positioned near the heads parked on the ramp. Lubricant having a high vapor pressure is disposed in the reservoir. During shutdown of the drive when the heads are parked on the ramps, the lubricant from the reservoirs provides a thin adsorbate film of lubricant on the heads. This system minimizes the vapor-phase concentration gradient between the reservoir unit and the nearest head so as to maintain a well-controlled lubricant film on the surface of the head. The lubricant reservoirs can also be positioned on the body of the load/unload structure near the heads parked on the ramp.

To achieve the aforementioned low fly heights, and corresponding shorter magnetic spacing, the slider is designed to be in full contact with the disk at initial stages in order to wear off typically 1-10 nm from the trailing edge of the ABS surface. More particularly, when the drive is started for the very first time, the slider starts in contact with the disk and is burnished (i.e., worn off) so that the slider trailing edge self-adjusts to the correct height and eventually either flies above the disk at a very low fly height or drags on the disk in contact with low friction and spacing modulation. A second advantage is that all or part of the carbon overcoat added to the slider to protect the slider from corrosion during manufacturing is removed. By removing the carbon overcoat, a gain of several nanometers (~1-5 nm) in the magnetic spacing can be achieved. A third advantage is that the standard deviation on the magnetic spacing is dramatically reduced compared to a traditional flying slider because each slider self-adjusts to the same final magnetic spacing, independent of parameters such as suspension gram load, pitch static attitude (PSA), or other manufacturing imposed variations.

However, as mentioned above, lubricant is placed on the disk prior to installing the disks into a drive to protect the slider and disk. The lubrication of the disk, by design, dramatically slows the wear process. A typical burnishing cycle on a lubricated disk can take 10-40 minutes on current disk substrates. While this may seem like a relatively short amount of time, one should keep in mind that every drive on the manufacturing line must be run for that long to burnish the slider to the final design point before servo data can be written. Thus, it would be desirable to reduce the burnishing time required during disk drive manufacture.

Another problem addressed in this disclosure is the badly controlled burnish process observed when trying to burnish these sliders on fully lubricated standard production disks. As mentioned above, finished hard disks are covered with a layer of lubricant (a perfluoroether polymer) prior to installation in the drive. To ensure replenishment capabilities, a fraction of this lubricant is not bonded to the disk surface. It has been observed that interaction between the slider trailing edge and the free lubricant can lead to severe instabilities, causing the slider to oscillate at its second pitch natural frequency (around 300 kHz for currently tested sliders) with an amplitude of more then 5 nm. This is a serious problem for disk reliability purposes, and more important it can cause incomplete and/or inconsistent burnishing of the slider. Thus it would also be desirable to reduce lubricant induced slider oscillation by avoiding lubricant transfer between the disk and the slider.

SUMMARY OF THE INVENTION

The present invention overcomes the drawbacks and limitations described above by providing a method for creating a disk drive. A slider is installed in a disk drive having at least one unlubricated disk. The slider is designed to be in contact with the disk at initial use (i.e., at the first moment that the slider is positioned over the disk for the burnishing step). The slider is burnished. A vapor phase lubricant reservoir system is installed in the drive either before or after the burnishing step. The vapor phase lubricant reservoir system provides a layer of lubrication on the disk.

Using this method, the slider is burnished in less than about one minute, and preferably in less than about 10-30 seconds of burnishing. Preferably, at least a portion of an overcoat on the ABS of the slider is removed during the burnishing.

Preferred lubricants include aliphatic carboxylic acids, aliphatic alcohols, and volatile perfluoropolyether compounds. The lubricant can be a solid, a liquid, or a mixture thereof. The lubricant reservoir system is positioned in the disk drive housing and can be positioned near a ramp of the disk drive.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

To avoid lubricant induced instabilities at the burnishing stage, the present method is used to build drives with disks having no free lubricant on their surface. After the burnishing stage, the disks can be lubricated to their nominal design point using vapor lubricant as described in more detail below.

Figure 1:
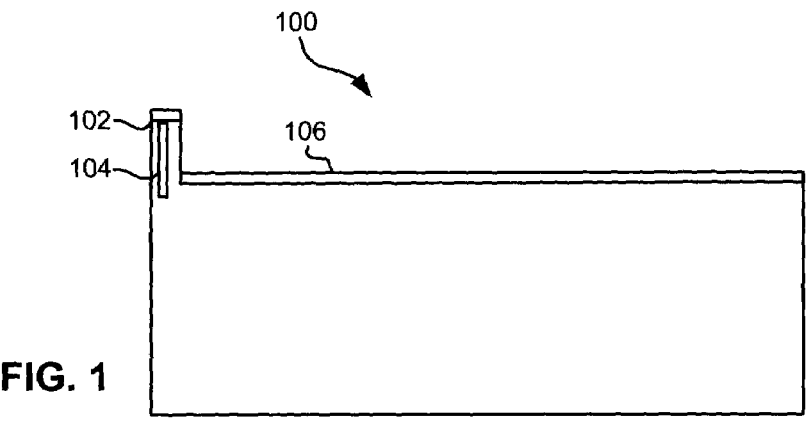
FIG. 1 is a simplified side view of a slider, not to scale, according to one embodiment.

FIG. 1 illustrates a propad slider 100 according to one embodiment. As shown, a protruding pad, hereinafter referred to as a "propad" 102 is positioned above the read/write elements 104. An overcoat 106 of carbon, $SiN_x$, etc. is formed over the entire structure.

It should he understood that other types of protrusions and materials can also be burnished, as well as heads having no deliberate protrusion. In such case, before burnishing, some sliders are in contact with the disk media and some are not. For example, about 0.5-10%, 10-25%, 25-50%, or 50-80% of the sliders may be in contact with the disk(s) prior to burnishing. Because of disk and slider roughness, sliders flying at a target fly height will initially contact the disk. Therefore, some sliders will fly too low. The goal then is to wear off a small portion only from these sliders to create clearance, while all sliders flying higher then the target fly height are not burnished. In the case of sliders having a propad, all sliders start in contact by design. If the burnishing is efficient, as set forth herein, then after burnishing, none of the sliders should be in contact. For simplicity, the following description shall refer to a propad 102 and carbon overcoat 106.

Figure 2:
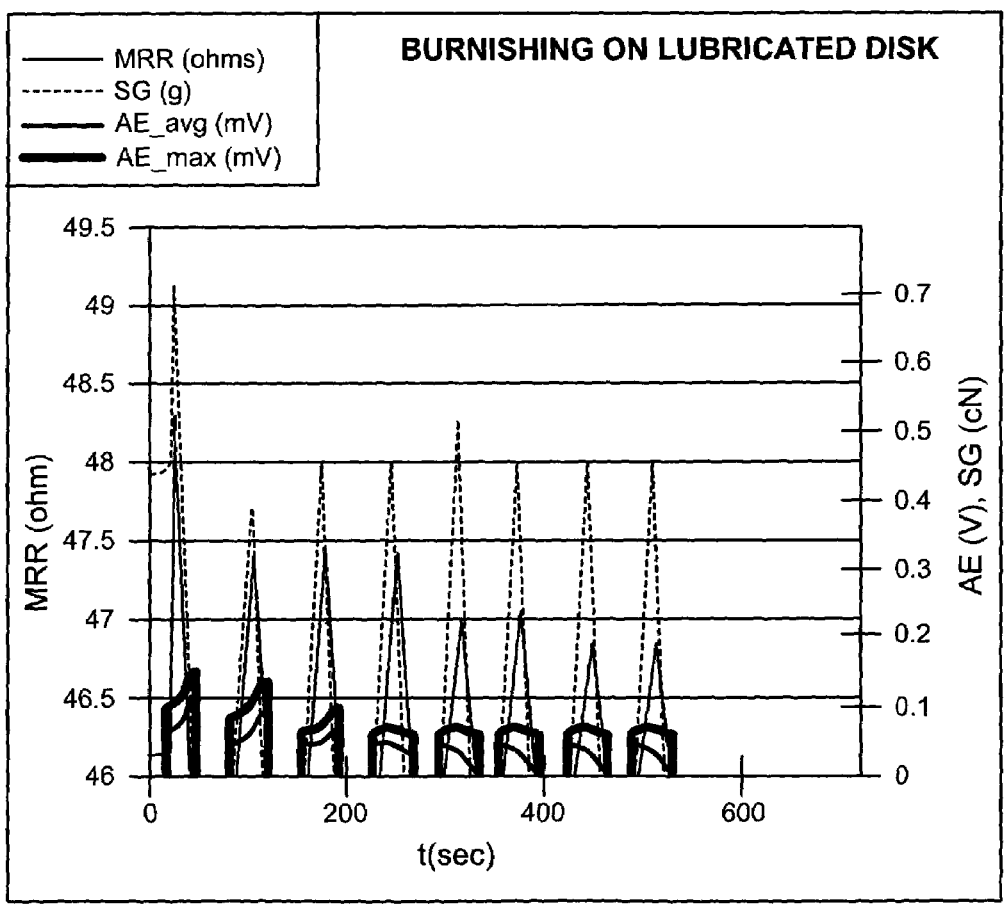
FIG. 2 is a chart illustrating test results of a burnishing process on a lubricated disk.

FIG. 2 is a chart 200 illustrating test results of a typical drive and propad slider assembly currently used by drive manufacturers, particularly illustrating the instability caused by burnishing on a disk lubricated with Z-Tetraol with X1P added. The test sequence consists of a 2 second sweep from the ramp at radius 44 mm to radius 18 mm on the disk, followed by a sweep in 60 seconds from radius 18 mm to the ramp at radius 44 mm. The disk then returns to the ramp. This way every time the slider is on the ramp, the change in MR resistance (MRR) due to burnishing only can be evaluated. Note that the MR resistance is proportional to the height of the propad. The MR element sits adjacent to the propad. As the propad is burnished away, the MR resistance is shortened. Thus burnishing can be monitored by reading MRR.

In this case, on the disk the MRR, friction (as measured by a strain gauge (SG)) and accoustic emission (AE) are high and do not decrease after 6 cycles. The MR resistance is high because of the heat caused by friction due to head disk interaction. At the same time, a laser Doppler vibrometer (LDV) positioned on the back of the slider shows that the slider oscillates at 300 kHz with an amplitude of more then 5 nm (data not captured). After 10 minutes however, the MR resistance on the ramp is only slightly higher (MRR(initial)=46.2 ohms, MRR(final)=46.4 ohms), indicating that no significant burnishing occurred. In fact, examination of the pad at 1000× magnification shows that only a part of the alumina of the propad was removed. This is likely due to the lubricating effect of the lubricant coupled with the bouncing of the slider on the disk, supporting the evidence that the slider is not flying stable.

In the experiment, a strain gauge (SG) was used to measure the friction between the slider and the disk (like a torque wrench). The AE was measured using a sensor that reads frequencies in a predetermined range (e.g., 100 kHz to 2 MHz) to detect contact of the slider with the disk. The LDV uses a laser beam to create a Doppler shift of the slider movement caused by the rotating disk, giving a measure of the displacement of the slider orthogonal to the disk. Note that the LDV can also be used to determine how well the slider follows the disk. Ideally, about a 1 nm displacement or less is created between the slider and disk if the slider is flying correctly.

Figure 3:
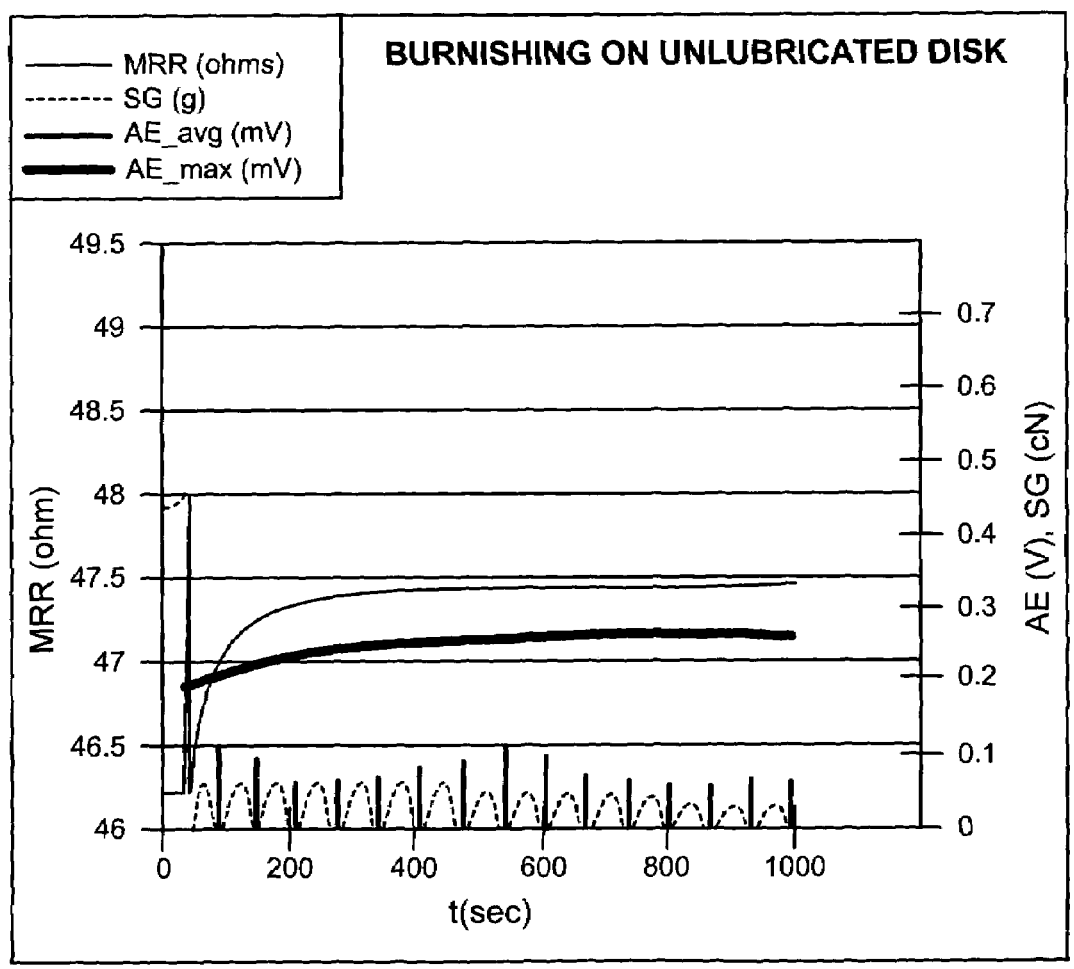
FIG. 3 is a chart illustrating test results of a burnishing process on an unlubricated disk.

Referring to the chart 300 in FIG. 3, the same slider was used on an unlubricated disk (same substrate and characteristics). As illustrated in FIG. 3, the MRR increases by more then 1 ohm in the first cycle and does not decrease when on the ramp indicating burnishing, i.e., that the carbon overcoat and propad have been completely removed. Within about 10 minutes, an equilibrium is reached. Also, it can be observed that the MRR increases very little on the disk compared to the ramp, indicating low frictional heating. The AE and SG are also very low. Moreover, LDV shows that the slider is flying stable as desired. The singular data point where the MRR, the AE and the SG are high corresponds to the unloading from the disk to the ramp. Analysis on the disk suggests 1 Å of carbon wear at that radius. Finally, examination of the pad at 1000× magnification shows that the pad burnished as desired.

Finally, the disk was replaced by the B-side of the lubricated disk previously used and the slider was positioned on track at radius 28 mm (0 skew). This time, the LDV indicated stable flying while MRR, AE and SG show that some additional burnishing took place in the first 20 seconds after which no additional change in MRR was observed when going back to the ramp. Also no AE signal was measured, indicating clearance was achieved.

On certain types of non lubricated disks, full burnishing can occur in a single load/unload taking less then 0.5 seconds.

In some cases, full burnishing does occur on lubricated disks within 10 minutes (e.g., 50% of the time). However, measurements still indicate unstable flying at the initial stages: very high MRR increase due to heating (3 ohms), high AE and SG, LDV signal at 300 kHz on the disk and Optical Surface Analyzer pictures showing lubricant ripples at 300 kHz. This is very likely to damage the disk and reduce long term reliability and must therefore be avoided. In a drive build, we suggest to use initially unlubricated disks. The sliders can then be burnished as desired on these disks. For long term reliability, it is desirable to add lubricant before shipping. This can be done using a vapor source of lubricant which will coat the disks to an equilibrium thickness of lubricant as desired.

Figure 4:
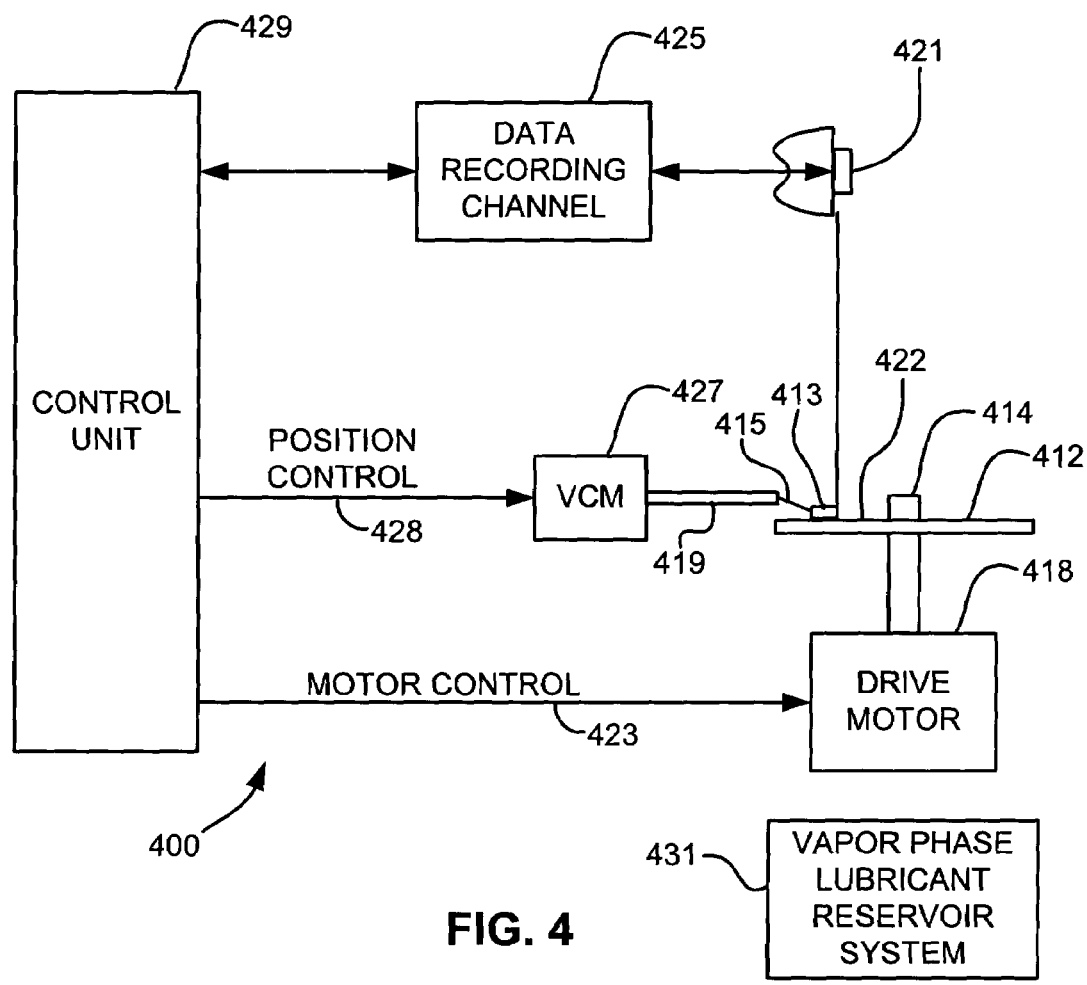
FIG. 4 is a simplified drawing of a magnetic recording disk drive system.

Referring now to FIG. 4, there is shown a disk drive 400 embodying the present invention. As shown in FIG. 4, at least one rotatable magnetic disk 412 is supported on a spindle 414 and rotated by a disk drive motor 418. The magnetic recording on each disk is in the form of an annular pattern of concentric data tracks (not shown) on the disk 412.

At least one slider 413 is positioned near the disk 412, each slider 413 supporting one or more magnetic read/write heads 421. As the disks rotate, slider 413 is moved radially in and out over disk surface 422 so that heads 421 may access different tracks of the disk where desired data are recorded. Each slider 413 is attached to an actuator arm 419 by way of a suspension 415. The suspension 415 provides a slight spring force which biases slider 413 against the disk surface 422. Each actuator arm 419 is attached to an actuator means 427. The actuator means 427 as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of disk 412 generates an air bearing between slider 413 and disk surface 422 which exerts an upward force or lift on the slider. The air bearing thus counter-balances the slight spring force of suspension 415 and supports slider 413 off and slightly above the disk surface by a small, substantially constant spacing during normal operation.

The various components of the disk storage system are controlled in operation by control signals generated by control unit 429, such as access control signals and internal clock signals. Typically, control unit 429 comprises logic control circuits, storage means and a microprocessor. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Read and write signals are communicated to and from read/write heads 421 by way of recording channel 425.

A vapor phase lubricant reservoir system 431 such as the systems described in U.S. Pat. Nos. 4,789,913 and/or 6,580,585 is positioned within the drive housing.

The above description of a typical magnetic disk storage system, and the accompanying illustration of FIG. 4 are for representation purposes only. It should be apparent that disk storage systems may contain a large number of disks and actuators, and each actuator may support a number of sliders.

Figure 5:
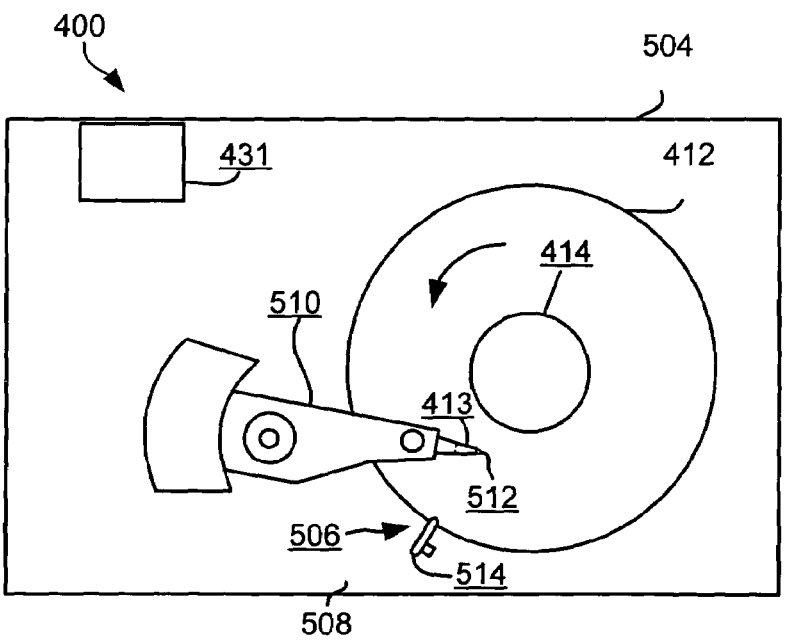
FIG. 5 is a partial top view of the disk drive system of FIG. 4 according to one embodiment of the present invention.

Referring to FIG. 5, there is shown a top view of the disk drive 400 of FIG. 4. The disk drive 400 has a disk pack comprising a plurality of stacked thin film magnetic recording disks 412 attached to the spindle 414 enclosed in housing 504. Load/unload structure 506 is fixedly secured to the base plate 508 of the housing 504 of the disk drive at the outer perimeter of disk pack. A rotary actuator assembly comprises a plurality of actuator arms 510 each supporting a slider 413 adjacent to a disk 412. Each actuator arm 510 suitably has a protrusion or tab 512 at its distal end for engaging a ramp 514 of the load/unload structure 506 during load/unload operations. The vapor phase lubricant reservoir system 431 is positioned in the housing 504.

The present invention preferably utilizes a controlled vapor pressure environment that communicates with magnetic media such as disks, to continuously maintain a mono-molecular organic lubricant layer on the surface of the disks. More specifically, the mono-molecular lubricant layer is in the range of about 3 to 15 angstroms thick.

A critical feature of the present invention is that the recording layer must have a propensity to surface-adsorb organic molecules. In a preferred embodiment, this propensity to adsorb organic molecules is provided by a carbon overcoat layer, for example amorphous carbon. A typical thickness for this carbon overcoat layer is in the range of about 15 to 35 angstroms.

The present invention makes use of the ability of the lubricant to vaporize. The airborne lubricant molecules deposit on the disk's overcoat layer, as needed, to provide a substantially continuous, mono-molecular layer of lubricant on the disk's recording surface.

Preferred organic lubricants for use in the present invention are: (1) the aliphatic carboxylic acids, of which palmitic acid and stearic acid are examples; (2) the aliphatic alcohols, of which stearal alcohol or 1-docosanol are examples; (3) the volatile perfluoropolyether compounds, which can include having certain specific functional end-groups are additional examples. Most of these materials generally exist as a solid or liquid at room temperature, but slowly pass to a vapor due to their inherent vapor pressure (i.e. the pressure that is exerted when a substance is in equilibrium with its own vapor). The liquids behave identically in this regard in that they also exhibit a specific and useful vapor pressure.

When constructing a disk file in accordance with the present invention, the disks are manufactured without any lubricant. When the disks contain a carbon overcoat, adsorption of the organic lubricant by this overcoat inherently results due to the high surface energy of the carbon layer.

This lubricant adsorption process, or more specifically the process by which a carbon overcoat layer adsorbs an organic material, is characterized by the theory of Langmuir kinetics. Therefore, mono-molecular coverage of the carbon layer by organic lubricant material is determined by the temperature of the carbon layer, the vapor pressure of the organic material being adsorbed, and the bond strength that exists between the carbon layer and the organic molecules residing on the carbon layer. This adsorption process, described by Langmuir kinetics is reversible since the above mentioned bond strength is relatively weak (physisorption and not chemisorption). Therefore, this bond can be disrupted by thermal energy available at disk file operating temperatures (generally 40 to 55 degrees centigrade).

Reversibility of the Langmuir process indicates that the disk's carbon layer would eventually lose its entire adsorbed organic film if pre-lubricated disks were placed in an unsealed, large container that was completely free of organic vapors (or if placed in a clean file with limited clean air flow).

In accordance with the present invention, such disks are placed into an environment where Langmuir kinetics are used to maintain the vapor pressure of the organic lubricant such that a film of that lubricant will be resident on the disk at the desired thickness. Thus, the disk obtains a mono-molecular lubricating layer which is maintained indefinitely (i.e. so long as the lubricant source is not totally consumed).

While the present invention is applicable to both a hermetically sealed disk file enclosure and a substantially sealed enclosure in which air flow induced through the enclosure is controlled, in preferred embodiments of the present invention, a partially sealed disk enclosure is provided (i.e. a disk file that allows a minimal amount of controlled airflow through the file). In these embodiments, a major portion of a stream of filtered air is induced to recirculate within the enclosure.

This air stream transports lubricant molecules to the disks, where Langmuir kinetics operate to cause the molecules to move between the air stream and the disk (i.e. pick up lubricant molecules from the disk, deposit molecules on the disk, or neither pickup nor deposit molecules) due to the above mentioned factors that are selected to produce a mono-molecular lubrication film on the disk, and due to the affinity of the disk's recording surface for molecules of organic material.

In a first embodiment of the present invention, the lubricant source is in bulk form, for example a pure crystalline or pure liquid form or mixtures thereof, and the rate of vaporization from this source is controlled by ensuring that the source is placed at a cool, or preferably the coolest location within the disk file. In this first embodiment of the invention, vapor pressure control of the lubricant source insures that the disks' mono-molecular lubricant layer is maintained only by operation of Langmuir kinetics.

When the lubricant source is at the coolest location in the disk file, vapors are transferred between the disk surface and the air stream only by operation of Langmuir kinetics, and the lubricant vapors do not appreciably condense on other components within the disk file, as by distillative or sublimative transfer.

In the first embodiment of the invention, a kinetic balance is maintained between the supply of lubricant and the surfaces of the disks, whereby the operating temperature of the supply of lubricant is maintained in the range of from about 0.5 to 7.0 degrees centigrade cooler than the disk surface upon which the mono-molecular lubricant layer is to be maintained. This thermal temperature differential establishes a relationship between the vapor pressure of the lubricant supply and the disks' lubricant layer, such that Langmuir kinetics operate to maintain the lubricant film in its mono-molecular state. This mono-molecular layer is maintained on the disks virtually independent of the operating temperature of the disk file over a range of from room temperature to about 70 degrees centigrade. Below room temperature, the system is still expected to be operational, but the rate constants are so dramatically reduced that the mono-molecular lubricant film becomes sufficiently stable without a reservoir source.

In a second embodiment of the invention, the lubricant source includes a mass of granular carrier particles, each grain of which is coated with a mono-molecular lubricant layer. The mass of the granular carrier has a very large total surface area, as compared to the surface area of the disks. The granular carrier is comprised of a material that also has an affinity for organic molecules, for example, the granules are formed from the same carbon that is used to coat the disks. This large granular surface area is coated with a mono-molecular layer of lubricant, to about the same thickness as the lubricant film on the disk.

In the construction and arrangement of this second embodiment, lubricant molecules transfer between the disk file's air stream and both the source and the disks by operation of Langmuir kinetics. This results from the fact that the carbon granules are coated with the same mono-molecular layer of lubricant as are the disks.

In a third embodiment of the invention, the lubricant's vapor pressure is controlled by combining the lubricant with a diluent that has a much lower vapor pressure than does the lubricant. This provides a bulk mixture whose vapor pressure is substantially identical to the vapor pressure of the disks' mono-molecular layer of lubricant.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
installing a slider into a disk drive having at least one unlubricated disk, the slider being designed to be in contact with the disk at initial use;
burnishing the slider about to equilibrium;
installing a vapor phase lubricant reservoir system in the drive;
wherein a lubricant of the vapor phase lubricant reservoir system is combined with a diluent,
wherein multiple sliders are installed and burnished, wherein about 0.5-10% of a number of the sliders installed in the disk drive are in contact with the at least one disk prior to burnishing.

2. A method, comprising:
installing a slider into a disk drive having at least one unlubricated disk, the slider being designed to be in contact with the disk at initial use;
burnishing the slider about to equilibrium;
installing a vapor phase lubricant reservoir system in the drive;
wherein a lubricant of the vapor phase lubricant reservoir system is combined with a diluent,
wherein multiple sliders are installed and burnished, wherein about 10-25% of a number of the sliders installed in the disk drive are in contact with the at least one disk prior to burnishing.

3. A method, comprising:
installing a slider into a disk drive having at least one unlubricated disk, the slider being designed to be in contact with the disk at initial use;
burnishing the slider about to equilibrium;
installing a vapor phase lubricant reservoir system in the drive;
wherein a lubricant of the vapor phase lubricant reservoir system is combined with a diluent,
wherein multiple sliders are installed and burnished, wherein about 25-50% of a number of the sliders installed in the disk drive are in contact with the at least one disk prior to burnishing.

4. A method, comprising:
installing a slider into a disk drive having at least one unlubricated disk, the slider being designed to be in contact with the disk at initial use;
burnishing the slider about to equilibrium;
installing a vapor phase lubricant reservoir system in the drive;
wherein a lubricant of the vapor phase lubricant reservoir system is combined with a diluent,
wherein multiple sliders are installed and burnished, wherein about 50-80% of a number of the sliders installed in the disk drive are in contact with the at least one disk prior to burnishing.

* * * * *

UNITED STATES PATENT AND TRADEMARK OFFICE
CERTIFICATE OF CORRECTION

PATENT NO. : 7,624,496 B2  
APPLICATION NO. : 10/652065  
DATED : December 1, 2009  
INVENTOR(S) : Fong et al.

It is certified that error appears in the above-identified patent and that said Letters Patent is hereby corrected as shown below:

In the Specification:
col. 3, line 48 replace "he" with --be--.

Signed and Sealed this

Sixteenth Day of February, 2010

David J. Kappos
*Director of the United States Patent and Trademark Office*